United States Patent Office 3,318,946
Patented May 9, 1967

3,318,946
PLASTICISER COMPOSITION
Ronald William Kay, Kirkella, England, assignor to The Distillers Company Limited, Edinburgh, Scotland, a British company
No Drawing. Filed Sept. 19, 1963, Ser. No. 310,126
Claims priority, application Great Britain, Sept. 29, 1962, 37,008/62
11 Claims. (Cl. 260—475)

This invention relates to novel plasticiser compositions especially for use in vinyl polymers and copolymers, and to polymer and copolymer compositions containing them.

It is known that a 1:4-di-(alkylphthalyl)-butene-2 may be used as a plasticiser in polyvinyl chloride compositions. Such a compound may be prepared by the reaction of 2 moles of an alkali metal monoalkylphthalate with one mole of a 1:4-dihalobutene-2. It is an object of the present invention to provide a process for producing valuable plasticisers by chemical modification of such esters and of analogous compounds prepared from alkali metal salts of monoalkyl acid esters of other dicarboxylic acids.

According to the invention the process for the production of a plasticiser composition comprises heating together at least one alkali metal salt of a monoalkyl ester of an aromatic or aliphatic dicarboxylic acid, a 1,4-dihalobutene-2 and at least one dialkali metal salt of an aromatic or aliphatic dicarboxylic acid.

In the process of the invention, the reaction product differs from that of the known process in that at least some of the ester linkages in the resulting product are derived from the reaction of this dialkali metal salt with the 1:4-dihalobutene-2 or with a derivative of the 1:4-dihalobutene-2 in which one of the halogen atoms has been replaced by another grouping during the course of the reaction.

The 1,4-dihalobutene-2 which may be a reactant in the process of the invention may be for instance 1,4-dichlorobutene-2 or 1,4-dibromobutene-2. 1,4-dichlorobutene-2 is preferred.

The dialkali metal salts and alkali metal monoalkyl salts of aromatic or aliphatic dicarboxylic acids may be derived, for example, from phthalic acid, isophthalic acid, terephthalic acid, succinic acid, adipic acid, sebacic acid, maleic acid or fumaric acid, or a mixture of any two or more of these. The salts may also be derived from other dicarboxylic acids including aromatic dicarboxylic acids having alkyl substituents on the benzene ring, or other substituents which do not react with the dihalobutene-2 under the conditions of the reaction.

The alkali metal component of the salt of the monoalkyl ester of the dicarboxylic acid and of the dialkali metal salt may be, for example, potassium or sodium. The alkyl group of the alkali metal monoalkyl ester may contain, for example, from one to twenty carbon atoms: this ester may be derived from such alcohols as methyl, ethyl, propyl, isopropyl, the so-called oxo-alcohols, 2-ethylhexanol, normal primary alcohols such as those prepared by Ziegler-type telomerisation of olefines, unsaturated alcohols such as allyl alcohol, cyclo aliphatic alcohols such as cyclohexanol, aromatic alcohols, and heterocyclic alcohols such as tetrahydrofurfuryl alcohol.

In the process of the invention, the proportions of the alkali metal salt of the monoalkyl ester of the dicarboxylic acid and of the dihalobutene-2 reacted together are preferably based on the assumption that two moles of the alkali metal monoalkyl ester and one mole of the dihalobutene-2 react to form the 1:4-di(alkylphthalyl)-butene-2. This product is modified chemically in the reaction by the presence in the reaction mixture of the dialkali metal salt of the dicarboxylic acid, together with an equimolar amount of additional dihalobutene-2. The amount of dialkali metal salt and of additional dihalobutene-2 may vary within a moderately wide range; as the amount of dialkali metal salt (with additional dihalobutene-2) is increased from zero to 0.5 mole per mole of alkali metal monoalkyl ester, the resistance of the product ester to petrol extraction, when used as a plasticiser in a polyvinyl chloride composition, increases. It is not normally advantageous to employ more than 0.5 mole of dialkali metal salt per mole of alkali metal monoalkyl ester.

The reaction mixture may be prepared in any suitable manner, for example by mixing the specified reactants, preferably in the presence of a suitable organic solvent or diluent. Alternatively, the dialkali metal salt and the dihalobutene-2 may be mixed with an alkali preferably an alkali metal carbonate, and the molar equivalent of the monoalkyl acid ester of the dicarboxylic acid, based on the amount of alkali present, added to the mixture. In this case it is also preferred to add a solvent or diluent; thus the reactants may in either case be in solution or suspension in an organic diluent such as an alkanol or an aromatic hydrocarbon. Preferred diluents include butanol and alkanols boiling higher than butanol, and aromatic hydrocarbons such as xylene. Where the alkali metal monoalkyl ester is formed in situ during the reaction the resulting water may suitably be removed during the course of the reaction as an azeotrope with the organic diluent.

The temperature at which the reaction is carried out may vary within moderately wide limits, but is preferably in excess of about 100° C., especially when water is formed in the reaction. The upper temperature limit is not especially critical, though it is not generally desirable to allow the reaction mixture to reach a temperature above 160° C. at any time during the course of the reaction.

The reaction is preferably carried out in the presence of a suitable esterification catalyst. Such catalysts include, tertiary amines, and quaternary ammonium salts. Especially preferred catalysts include for example trialkylamines derived from the same or different alkyl groups of any chain lengths, such as triethylamine, trimethylamine, heterocyclic tertiary bases such as pyridine and alkyl pyridines, and quaternary salts derived from any such tertiary amines, such as trimethyl benzyl ammonium chloride, and 1,4-di(triethylamino)butene-2 dichloride. Theoretically possible products of the reaction may be illustrated by considering an actual case in which the starting materials used are a 1,4-dihalobutene-2, sodium monobutyl phthalate and disodium phthalate. In this case the possible products include 1,4-di(butylphthalyl) butene-2 formed by the elimination of two molecules of sodium halide from two molecules of sodium monobutylphthalate and one molecule of 1,4-dihalo butene-2, and di[4-(butylphthalyl)but-2-en-1-yl] phthalate, formed by the elimination of four molecules of sodium halide from two molecules of sodium monobutyl phthalate, one molecule of disodium phthalate, and two molecules of 1,4-dihalobutene-2.

When the product of the process of this invention is used as a plasticiser in a vinyl polymer, however, the properties of the plasticised polymer are dissimilar from those of polymers plasticised with either of the above-mentioned theoretically possible compounds, and the average molecular weight of the plasticiser composition does not correspond with the molecular weight of either. It is believed that the product is a mixed phthalate ester plasticiser which may contain either or both of the above-mentioned possible products. In vinyl polymer compositions, the product of the process of the invention has valuable properties as a non-extractible plasticiser when subjected to the action of hydrocarbon solvents such as light petroleum.

The invention is illustrated by the following examples, which relate to plasticiser compositions containing phthalyl and succinyl groups. When derivatives of other dicarboxylic acids within the scope of the invention are incorporated in the reaction mixture, or when other catalysts of the kind disclosed are employed, similar compositions are obtained.

Example 1

1.25 moles of phthalic anhydride was dissolved in 1.375 moles of n-butanol, the temperature of the solution being kept below 105° C. The liquid half-ester product, n-butyl acid phthalate, was added during a period of 80 minutes to a stirred mixture of 1.25 moles of 1,4-dichlorobutene-2, 0.625 mole of disodium phthalate, 0.688 mole of sodium carbonate and 0.04 mole of trimethylbenzyl ammonium chloride in 312 ml. of n-butanol. The temperature of the mixture was 110° C. when addition of the half-ester commenced, and it rose slowly in the course of the addition to 122° C. Water evolved in the reaction was removed as an azeotrope with n-butanol. When addition of the half-ester was complete, the mixture was refluxed for four and a half hours.

The product was washed with water to remove sodium chloride, and then with sodium hydroxide and finally again with water. Excess butanol was removed by steam stripping in the presence of five grams of active carbon and the product was vacuum dried at 120° C. under a pressure of 10 millimetres of mercury. After removal of the carbon, 419 grams of a pale yellow ester was obtained; the theoretical yield for complete reaction in the proportions taken was 446 grams. The saponification value of the product was 442, and it had an acidity equivalent to 1 milligram of potassium hydroxide per gram of product.

Example 2

Phthalic anhydride (1.375 mole) was dissolved in n-butanol (1.52 mole) at a temperature below 105° C. The liquid half-ester was added over 1 hour 28 minutes, to a stirred mixture of 1,4-dichlorobutene-2 (1.25 mole), disodium phthalate (0.625 mole), sodium carbonate (0.757 mole), and trimethylbenzylammonium chloride (0.016 mole) in n-butanol (312 ml.). The addition was begun at 110° C. and the base temperature gradually rose to 123° C. Water of neutralisation was removed as the azeotrope with butanol. After complete addition of the half-ester, the mixture was refluxed for a further ten hours.

Sodium chloride was removed by washing with water and the crude ester was then caustic washed and water washed. The excess of butanol was removed by steam stripping and the product was vacuum dried at 120° C./10 mm. The yield of pale yellow ester was 436 g. Saponification value=445.

Example 3

The quantities of the reactants and reaction conditions were as in Example 2 but the catalyst was triethylamine (0.061 mole). The yield of ester was 430.6 g. Saponification value=435.

Example 4

The quantities of the reactants and reaction conditions were as in Example 2 except that 1,4-dichlorobutene-2 (1.24 mole) was used and the catalyst was triethylbenzylammonium chloride (0.062 mole).

The yield of pale yellow ester was 410 g. Saponification value=431.

Example 5

The quantities of the reactants and reaction conditions were as in Example 2 except that the initial charge of 1,4-dichlorobutene-2 was 1.22 mole and the amount of n-butanol was 263 ml. The catalyst was 1,4-di(triethylamino)butene-2 dichloride (0.03 mole) which was added as a 20% w./w. solution in butanol.

The yield of ester was 441 g. Saponification value=431.

Example 6

Disodium succinate (1 mole), 1,4-dichlorobutene-2 (2 moles), anhydrous sodium carbonate (1.21 moles), 500 ml. n-butanol, and trimethylbenzylammonium chloride (0.097 mole) were placed in a 2 litre, four necked, flask fitted with a mercury sealed stirrer, thermometer, heated dropping funnel and Dean & Stark head with reflux condenser. The solids were added to the stirred butanol to ensure wetting of the powders.

The flask was placed in an oil bath set at 140° C. When the reactor contents reached 110° C., 2.2 moles of monobutyl phthalic acid was added during 90 minutes.

After the addition of the acid, the flask was left in the oil bath for 10 hours. It was then cooled and the contents were washed and purified as in Example 1.

The yield of ester for 67° g. before carbon treatment.

Example 7

An ester was prepared as described in Example 6, except that the monobutyl phthalic acid was replaced by monobutyl succinic acid.

The reactants were: disodium succinate (1 mole) 1:4-dichlorobutene-2 (2 moles), anhydrous sodium carbonate (1.21 moles), 500 ml. butanol and trimethylbenzylammonium chloride (0.097 mole). To the heated mixture at 110° C. was added 2.2 moles of monobutyl succinic acid over a period of 90 minutes. The mixture was then heated for 10 hr. in an oil bath at 140° C. The washing procedure was exactly as described in Example 1. The yield was 417 g. after carbon treatment.

Example 8

An ester was prepared as described in Example 6 but using a mixture of disodium succinate with disodium phthalate instead of disodium succinate as above. The change to the flask was: 500 ml. of butanol, 0.25 mole of disodium succinate, 0.75 mole of disodium phthalate, 2 moles of 1:4 -dichlorobutene-2, 1.21 moles of anhydrous sodium carbonate and 0.097 mole of trimethylbenzylammonium chloride.

2.2 moles of monobutyl phthalic acid were added over a period of 90 mins. to the reaction mixture and the washing procedure was the same as in Example 1. The yield was 608 g.

Example 9

1.375 moles of phthalic anhydride was dissolved in 1.52 moles of n-butanol, the temperature of the solution being kept below 105° C. The liquid half-ester product, n-butyl acid phthalate, was added during a period of 88 minutes to a stirred mixture of 1:4-dichlorobutene-2 (1.24 moles) disodium phthalate (0.625 mole) sodium carbonate (0.757 mole) and trimethylbenzylammonium chloride (0.061 mole) in xylene (312.5 ml.). The temperature of the mixture was 127° C. when addition of the half-ester commenced and it rose during the course of the addition to 145° C. Water evolved in the reaction was removed as an azeotrope with xylene. When addition of the half-ester was complete, the mixture was refluxed for five hours. The product was washed and purified as in Example 1. The yield of ester was 99.3%, and its saponification value was 455.

Example 10

1.65 moles of phthalic anhydride was dissolved in 1.82 moles of n-butanol, the temperature of the solution being kept below 105° C. The liquid half-ester product, n-butyl acid phthalate, was added during a period of 90 minutes to a stirred mixture of 1:4-dichlorobutene-2 (1 mole) disodium phthalate (0.25 mole), sodium carbonate, (0.908 mole) and trimethylbenzylammonium chloride (0.0485 mole) in xylene 250 ml. The temperature of the mixture was 110° C. when addition of the half-ester commenced and it rose during the course of the addition to 138° C. Water evolved in the reaction was removed as an azeotrope with xylene. When addition of the half-ester was complete, the mixture was refluxed for 5 hr. The product was washed with water to remove sodium chloride and then with sodium hydroxide and finally again with water. Excess xylene was removed by steam stripping in the presence of 10 g. of active carbon and the product was vacuum dried at 120° C. under a pressure of 10 millimetres of mercury. A quantitive yield of the mixed ester was obtained.

*Example 11*

1.93 moles of phthalic anhydride was dissolved in 2.12 moles of n-butanol, the temperature of the solution being kept below 105° C. The liquid half-ester product, n-butyl acid phthalate, was added during a period of 88 minutes to a stirred mixture of 1,4-dichlorobutene-2 (1 m.), disodium phthalate (0.125 m.) sodium carbonate (1.06 m.) and trimethylbenzylammonium chloride (0.049 m.) in 250 ml. of xylene. The temperature of the mixture was 126° C. when addition of the half-ester commenced and it rose during the course of the addition to 130° C. Water evolved in the reaction was removed as the azeotrope with xylene. When addition of the half-ester was complete, the mixture was refluxed for five hours. This ester was purified in the manner reported in Example 1. The yield of ester was 95.4%. Saponification value=453.

The products of Examples 2, 9, 10 and 11 were evaluated as plasticisers in polyvinyl chloride; they were incorporated in the resin in an amount equal to 50 parts by weight of plasticiser per hundred parts of resin. The results are shown in the following table which also includes results on similar polyvinyl chloride compositions including as plasticisers 1,4-di(butylphthalyl)butene-2 and a conventional phthalate plasticiser.

I claim:

1. A process for the production of a plasticizer composition which comprises heating together at a temperature of from 100° C. to 160° C. at least one potassium or sodium salt of a mono ester of a dicarboxylic acid selected from the group consisting of aliphatic, cycloaliphatic, aromatic and heterocyclic moieties having from 1 to 20 carbon atoms, 1,4-dibromobutene-2 or 1,4-dichlorobutene-2, at least one dipotassium or disodium salt of a dicarboxylic acid in a molar ratio of from 1:1:0.5 to 1:0.5:0.5 in the presence of a tertiary amine or quaternary ammonium salt as an esterification catalyst and recovering the composition formed.

2. A plasticizer produced according to the process of claim 1.

3. A process according to claim 1 in which the potassium or sodium salt of the mono ester of the dicarboxylic acid is derived from an acid selected from the group consisting of phthalic acid, isophthalic acid, terephthalic acid, succinic acid, adipic acid, subacic acid, maleic acid and fumaric acid, and mixtures of any two such acids.

4. A process according to claim 1 in which the dipotassium or disodium salt of the dicarboxylic acid is selected from the group consisting of disodium and dipotassium phthalates, isophthalates, terephthalates, succinates, adipates, sebacates, maleates, fumarates, and mixtures of any two such salts.

5. A process according to claim 1 in which the mono ester is prepared within the reaction mixture from the corresponding alkyl acid ester and an alkali.

6. A process according to claim 5 in which the alkali is an alkali metal carbonate.

7. A process according to claim 1 in which an organic diluent is added.

8. A process according to claim 7 in which the organic diluent is an alcohol having at least four carbon atoms.

9. A process according to claim 8 in which the organic diluent is butanol.

10. A process according to claim 7 in which the organic diluent is an aromatic hydrocarbon.

TABLE

| Plasticiser | Tensile Strength, p.s.i. | Elongation at Break, Percent | Softness No. | Volatile Loss, Percent | Low Temp. Flexibility, °C. | Petrol Extraction, mgs./sq. cm. |
|---|---|---|---|---|---|---|
| 1,4-di(butylphthalyl) butene-2 | 3,700 | 280 | 23 | 0.7 | +6.5 | 2.5 |
| Product of Example 2 | 3,750 | 300 | 19 | 0.6 | +9.0 | 2.1 |
| Product of Example 9 | 3,700 | 290 | 8 | 0.4 | | 1.2 |
| Product of Example 10 | 3,800 | 290 | 16 | 0.2 | +7.0 | 1.9 |
| Product of Example 11 | 3,800 | 290 | 19 | 0.6 | +6.5 | 2.3 |
| Mixed C$_7$-C$_9$ Phthalates | 3,100 | 325 | 35 | 0.7 | −17.5 | 14.0 |

These results shown in the table show that the ester product of the process of this invention is a satisfactory plasticiser with considerable resistance to extraction by petroleum solvents.

11. A process according to claim 8 in which the organic diluent is xylene.

References Cited by the Examiner

UNITED STATES PATENTS 2,909,500  10/1959  Dazzi _____ 260—31.8
2,975,210   3/1961  Raether et al. _____ 260—485
3,004,947  10/1961  Dazzi _____ 260—485

MORRIS LIEBMAN, *Primary Examiner.*

A. LIEBERMAN, *Assistant Examiner.*